United States Patent
Butler et al.

(10) Patent No.: US 9,149,907 B2
(45) Date of Patent: Oct. 6, 2015

(54) THROUGH COOLANT ADAPTOR FOR USE ON HOLLOW SPINDLE MACHINE TOOLS

(75) Inventors: Shane Butler, Lincoln (GB); Gordon Lanes, Sleaford (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 302 days.

(21) Appl. No.: 13/701,059

(22) PCT Filed: May 31, 2011

(86) PCT No.: PCT/EP2011/058901
§ 371 (c)(1),
(2), (4) Date: Feb. 6, 2013

(87) PCT Pub. No.: WO2011/154282
PCT Pub. Date: Dec. 15, 2011

(65) Prior Publication Data
US 2013/0217313 A1    Aug. 22, 2013

(30) Foreign Application Priority Data

Jun. 10, 2010  (EP) .................................... 10165517

(51) Int. Cl.
*B24B 55/02* (2006.01)
*B23B 31/02* (2006.01)
*B23Q 11/10* (2006.01)

(52) U.S. Cl.
CPC ................. *B24B 55/02* (2013.01); *B23B 31/02* (2013.01); *B23Q 11/1023* (2013.01);
(Continued)

(58) Field of Classification Search
CPC  B23B 27/10; B23B 2240/24; B23B 2250/12; B23B 2231/24; B23C 5/28; B23C 2250/12; B23C 2240/245; B23D 59/025; B23Q 11/1015; B23Q 11/1023; B23Q 11/1092; B24B 55/02; B24D 7/10
USPC ............. 407/11; 451/342, 343, 360, 363, 450
See application file for complete search history.

(56) References Cited

U.S. PATENT DOCUMENTS 4,322,189 A * 3/1982 Briese ........................... 409/136
4,921,376 A * 5/1990 Tani et al. ..................... 409/131

(Continued)

FOREIGN PATENT DOCUMENTS

DE      4033607 A1    4/1992
DE     10251922 A1    6/2003
(Continued)

OTHER PUBLICATIONS

Mate Tooling Solutions Ltd "VARIO-TOOL-GRINDER VTG II" www.matetoolingsolutions.co.uk.

*Primary Examiner* — Timothy V Eley

(57) ABSTRACT

An adaptor and a connection device are provided. The adaptor and the connection device fix a tool to an arbor of a hollow spindle machine. The adaptor has an inlet opening at a first part of the adaptor, the inlet opening being connectable to the central passage way of the arbor. The adaptor has an outlet opening at a second part of the adaptor, the second part radially protruding over the first part and being adapted for holding the tool. The adaptor has a connection device for fixing the adaptor to the arbor and a fluid distribution passage way connecting the inlet opening with the outlet opening so that the coolant is supplied to the tool via the outlet opening of the adaptor.

7 Claims, 3 Drawing Sheets

(52) U.S. Cl.
CPC ........ *B23B 2231/24* (2013.01); *B23B 2240/24* (2013.01); *B23B 2250/12* (2013.01); *B23C 2240/245* (2013.01); *B23C 2250/12* (2013.01)

(56) References Cited

U.S. PATENT DOCUMENTS

| | | | | |
|---|---|---|---|---|
| 4,929,131 | A * | 5/1990 | Allemann | 409/234 |
| 5,468,176 | A * | 11/1995 | Udert et al. | 451/359 |
| 5,993,297 | A | 11/1999 | Voss | |
| 6,520,842 | B2 * | 2/2003 | Yasue et al. | 451/47 |
| 7,673,706 | B2 * | 3/2010 | Simmons | 175/57 |
| 7,963,729 | B2 * | 6/2011 | Prichard et al. | 407/11 |
| 8,858,125 | B2 * | 10/2014 | Pilkington | 407/11 |
| 2002/0034427 | A1 | 3/2002 | Senzaki | |
| 2002/0106251 | A1 | 8/2002 | Ripley | |
| 2006/0029481 | A1 | 2/2006 | Frota De Souza | |
| 2007/0231097 | A1 | 10/2007 | Ballas | |
| 2009/0142150 | A1 * | 6/2009 | Chu | 408/59 |
| 2009/0226268 | A1 | 9/2009 | Pilkington | |
| 2011/0250827 | A1 * | 10/2011 | Smith et al. | 451/449 |

FOREIGN PATENT DOCUMENTS

| | | |
|---|---|---|
| GB | 1546590 A | 5/1979 |
| GB | 2329350 A | 3/1999 |
| JP | 2004276136 A | 10/2004 |
| JP | 2004338000 A | 12/2004 |
| SU | 1389988 A1 | 4/1988 |
| SU | 1685681 A1 | 10/1991 |
| SU | 1726219 A1 | 4/1992 |
| WO | WO 9615878 A1 | 5/1996 |
| WO | WO 2007003248 A1 | 1/2007 |

* cited by examiner

THROUGH COOLANT ADAPTOR FOR USE ON HOLLOW SPINDLE MACHINE TOOLS

CROSS REFERENCE TO RELATED APPLICATIONS

This application is the US National Stage of International Application No. PCT/EP2011/058901 filed May 31, 2011 and claims the benefit thereof. The International Application claims the benefits of European application No. 10165517.3 filed Jun. 10, 2010, both of the applications are incorporated by reference herein in their entirety.

FIELD OF THE INVENTION

The present invention relates to hollow spindle machines using tools. In particular the present invention relates to an adaptor being adapted for fixing a tool or a cup style tool to an arbor and being adapted for providing coolant to internal contact points of a cup style tool to a workpiece. The present invention finds application in manufacture of curvic couplings, of turbines for turbine engines, and of vanes.

BACKGROUND OF THE INVENTION

In the manufacture process of curvic couplings, central discs of turbines, and vanes, for instance, tools or cup style tools like cup style grinding wheels, cup style cutting wheels, cup style lapping wheels, and cup style polishing wheels are used. These cup style tools are rotated by an arbor and are brought into contact with a workpiece. The interaction of the cup style tool and the workpiece generates heat energy, which can have detrimental influences on the tool itself as well on the workpiece to be manufactured. The detrimental influences can be the production of cracks and fractures of the tool and the workpiece, which will reduce the lifetime of the tool and the workpiece and which makes the operation of the tool and the workpiece more dangerous. Moreover, the generated heat might discolor the workpiece and might damage or remove temper or heat treatment on the workpiece.

To reduce the generation of heat and to lead away the generated heat from the tool and the workpiece it is well known to use a coolant, which is delivered to the contact area of the tool with the workpiece. The coolant is delivered to the contact area e.g. by spraying the coolant to the contact points of the tool and the workpiece.

U.S. Pat. No. 5,993,297 describes a superabrasive grinding wheel with integral coolant passages. The described grinding wheel comprises a fluid distribution passageway having a central supply tube formed within a tool holder, an annular space and guide channels formed within the body of the grinding wheel, and a plurality of non-perpendicular fluid delivery openings formed in the grinding surface so that coolant fluids at pressures of 14 bar and greater can be received within the fluid distribution passageway and delivered in a controlled manner toward the grinding surface via the delivery openings for either cooling the grinding tool and the workpiece.

SUMMARY OF THE INVENTION

When a cup style tool having a base and a wall, wherein the wall delimits the hollow of the cup and is circular centered on the axis of rotation of the tool, is used for grinding, cutting, lapping or polishing, coolant delivery to the contact points of the tool to the workpiece is desired to establish a layer of coolant on the tool and the workpiece. The coolant reduces the generation of heat energy.

While it is generally no problem to provide coolant at an external contact point of the wall of the tool to the workpiece, supply of coolant to an internal contact point of the tool to the workpiece presents a problem. In the art this problem is approached by flexible coolant pipes. These flexible coolant pipes require constant manual adjustment. Moreover, these flexible coolant pipes do not allow an automatic changing of tools and do not allow a high pressure supply of coolant, which is required for modern high speed hollow spindle machine tools.

One object of the present invention is to enhance the lifetime of a tool, such as a grinding tool, a cutting tool, a lapping tool or a polishing tool. A further object of the present invention is to enhance coolant supply to the contact points of the tool to the workpiece. A further object of the present invention is to improve the handling of a hollow spindle machine tool by omitting the need for constant manual adjustment of coolant pipes. Another object of the present invention is to provide a hollow spindle machine tool allowing automatic changing of tools.

These problems are solved by the independent claims of the present invention.

One common new and inventive feature of these claims is the utilization of a through spindle high pressure coolant to feed an adaptor, which directs the coolant where required.

According to an first aspect of the present invention an adaptor for fixing a tool to an arbor, wherein the arbor exhibits a central passage way for supplying a coolant, comprises: an inlet opening at a first part of the adaptor, the inlet opening being connectable to the central passage way of the arbor; at least one outlet opening at a second part of the adaptor, the second part radially protruding over the first part and being adapted for holding the tool; a connection means for fixing the adaptor to the arbor; and a fluid distribution passage way connecting the inlet opening with the at least one outlet opening so that the coolant is supplied to the tool via the at least one outlet opening of the adaptor.

The fluid distribution passage way can e.g. be composed of a first conduit connected with at least one second conduit, wherein the first conduit extends coaxially to the adaptor and the second conduit being tilted to the first conduit.

The geometry of the second conduit can e.g. be cylindrical or conical. But the present invention is not limited to these two geometries. The shape of the second conduit can be adapted to different geometries of the tool and the coolant adaptor. Therefore, curved geometries for the second conduit are also possible. When the shape of the second conduit is conical, the diameter of the second conduit at the at least one outlet opening can be larger or smaller than the diameter of the second conduit at the contact point to the first conduit. In the case of more than one outlet opening the diameter of a part of the outlet openings can be larger than the diameter of the second conduit at the contact point to the first conduit and the diameter of the other outlet openings can be smaller than the diameter of the second conduit at the contact point to the first conduit. Moreover, the first conduit can have different shapes depending on the geometry of the tool and the adapter. E.g. the shape of the first conduit can be cylindrical or conical or can have a curved shape.

The connection means of the adaptor is e.g. a thread. But the present invention is not limited to this. The connection of the adaptor to the arbor can e.g. be realized by a clamping or by a frictional connection. Other realizations of the connection means, which appear suitable to the person skilled in the art, are also covered by the scope of the present invention.

The above disclosed adaptors are formed integrally. But the present invention is not limited to an integrally formed adaptor.

According to a second aspect of the present invention an adaptor for fixing a tool to an arbor, wherein the arbor exhibits a central passage way for supplying a coolant, comprises: a first part connectable to the arbor; a second part radially protruding over the first part, the second part being adapted for holding the tool; and a vacancy through the first part and the second part, the vacancy being adapted for accommodating a connection device; wherein the second part comprises at least one conduit connecting the vacancy with at least one outlet opening in the second part.

The geometry of the conduit can e.g. be cylindrical or conical. But the present invention is not limited to these two geometries. The shape of the conduit can be adapted to different geometries of the tool and the coolant adaptor. Therefore, curved geometries for the conduit are also possible. When the shape of the conduit is conical, the diameter of the conduit at the at least one outlet opening can be larger or smaller than the diameter of the conduit at the contact point to vacancy. In the case of more than one outlet opening the diameter of a part of the outlet openings can be larger than the diameter of the conduit at the contact point to the vacancy and the diameter of the other outlet openings can be smaller than the diameter of the conduit at the contact point to the vacancy.

The adaptor is fixed to an arbor by a connection device, wherein the arbor exhibits a central passage way for supplying coolant. The connection device comprises: an inlet opening and at least one outlet port at a first part of the connection device, the inlet opening being connectable to the central passage way of the arbor; a second part radially protruding over the first part and being adapted for holding the adaptor; a connection means for fixing the connection device to the arbor; and a fluid distribution passage way connecting the inlet opening with the at least one outlet port; wherein the at least one outlet port corresponds to the at least one conduit of the adaptor when the connection device fixes the adaptor to the arbor so that the coolant is supplied to the tool via the at least one outlet opening of the adaptor.

The connection means of the connection device is e.g. a thread. But the present invention is not limited to this. The connection of the connection device to the arbor can e.g. be realized by a clamping or by a frictional connection. Other realizations of the connection means which appear suitable to the person skilled in the art are also covered by the scope of the present invention.

The adaptor according to the second aspect of the present invention and the connection device present a system for fixing a tool to an arbor, wherein the arbor exhibits a central passage way for supplying a coolant.

The adaptor according to the first aspect of the present invention and the adaptor and the connection device according to the second aspect of the present invention are adapted for fixing a tool to an arbor. Thereby, the tool can be a cup style tool or a planar tool.

BRIEF DESCRIPTION OF THE DRAWINGS

The foregoing and other features and advantages of the present invention will become more apparent in the light of the following description and the accompanying drawings, where.

DETAILED DESCRIPTION OF EXEMPLARY EMBODIMENTS

Figure 1:
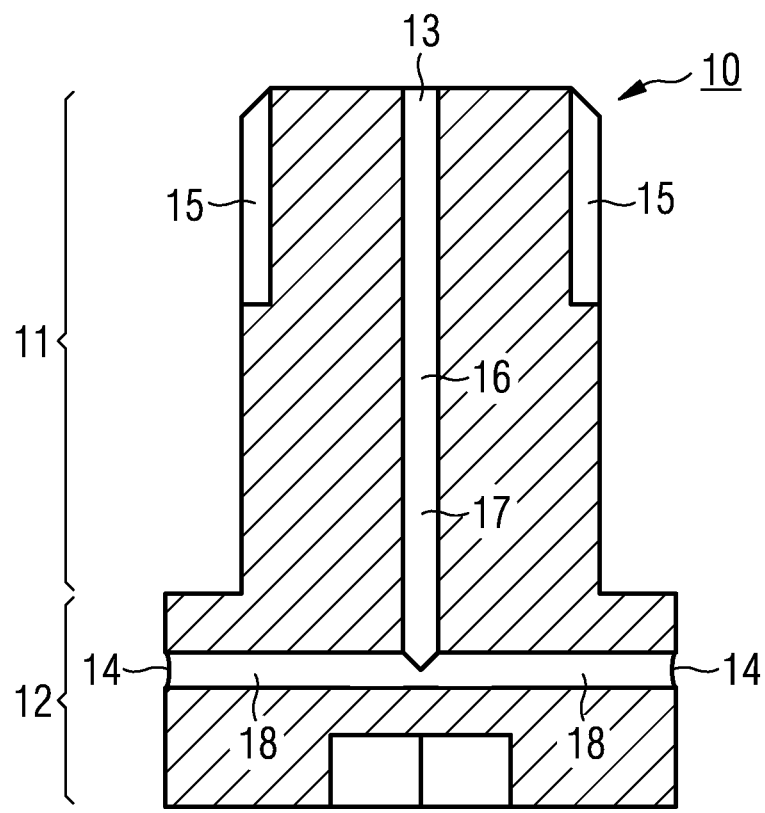
FIG. 1 shows a cross sectional view of an adaptor for fixing a tool to an arbor according to the first embodiment of the present invention.

A first exemplary embodiment will be described in the following. FIG. 1 shows a cross sectional view of an adaptor 10 for fixing a tool 2 to an arbor 100 according to the first embodiment of the present invention. Thereby, the arbor 100 can e.g. be a part of a hollow spindle machine for processing a workpiece. The tool 2 can be e.g. a grinding wheel like a cup style grinding wheel for grinding workpieces such like curvic couplings or turbines for turbine engines.

The adaptor 10 comprises an inlet opening 13 at a first part of the adaptor 10. The inlet opening 13 is connectable to a central passage way 101 of the arbor 100. Moreover, the adaptor comprises at least one outlet opening 14 at a second part 12 of the adaptor 10. The inlet opening 13 is connected to the at least one outlet opening 13 by a fluid distribution passage way 16.

In FIG. 1 an adaptor 10 with two outlet openings 14 is shown. The outlet openings 14 are disposed on the side face of the second part 12 of the adaptor 10. However, the at least one outlet opening 14 can also be disposed on e.g. the front face of the second part 12 of the adaptor.

To fix the adaptor 10 to an arbor 100 the adaptor 10 comprises a connection means 15. The connection means 15 can e.g. be a thread so that the adaptor 10 can be screwed into a winding of the arbor 100. A tool 2 positioned between the adaptor 10 and the arbor 100 is fixed to the arbor 100 by the second part 12 of the adaptor 10, the second part 12 radially protruding over the first part 11 of the adaptor. But the connection means 15 is not limited to a thread. The connection between the adaptor 10 and the arbor 100 can alternatively be realized by clamping, by frictional connection or by a snap fit.

Figure 4:
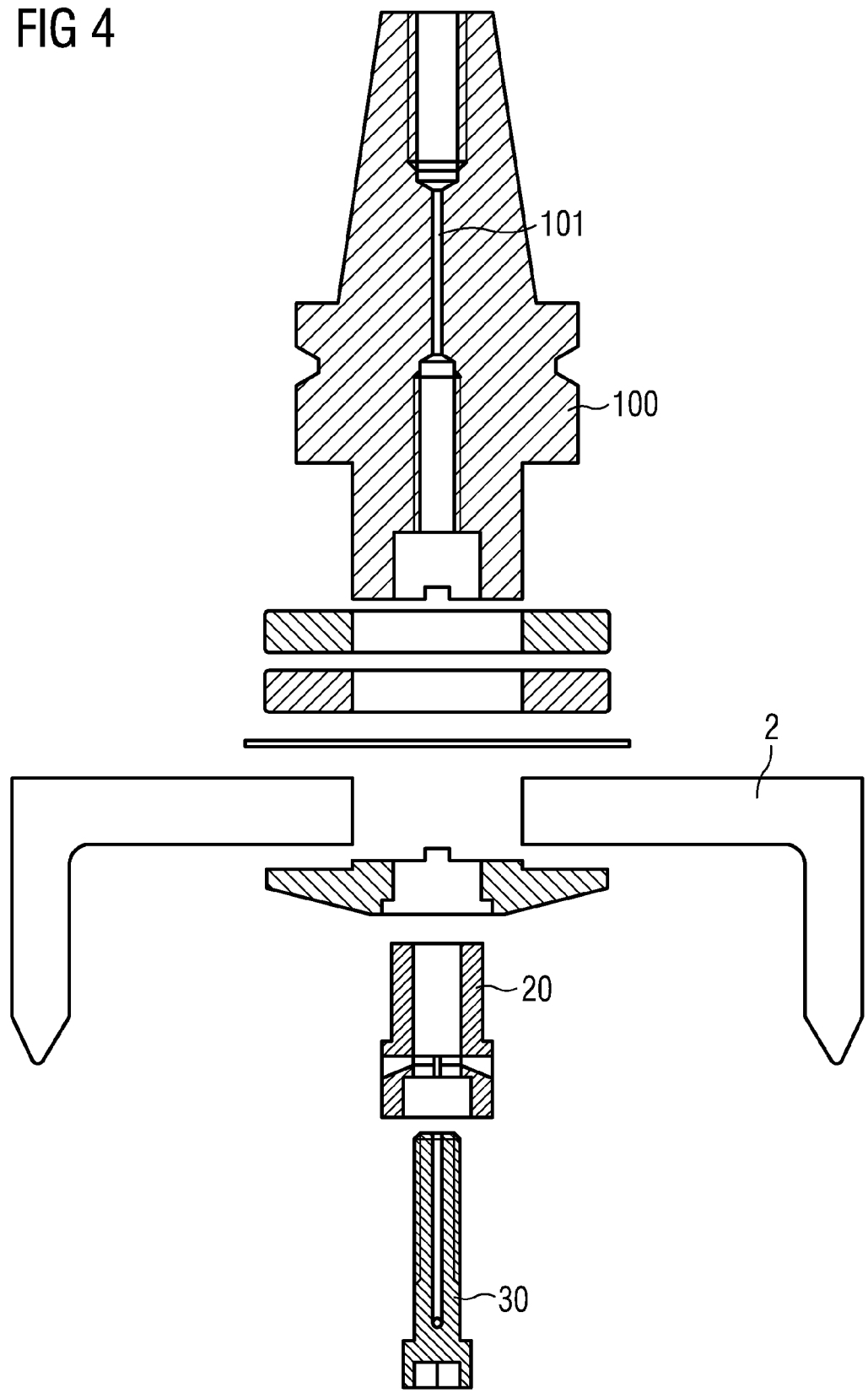
FIG. 4 is an assembly drawing of a hollow spindle machine tool.

When the tool 2 is fixed to the arbor 100 by the adaptor 10, the inlet opening 13 of the adaptor 10 is connected to a central passage way 101 of the arbor 100, which is not shown in FIG. 1 but in FIG. 4. Therefore, the outlet opening 14 of the adaptor 10 is connected to the central passage way 101 of the arbor 100 via the fluid distribution passage way 16 and the inlet opening 13. A pressurized coolant, which is supplied through the central passage way 101 is supplied through the at least one outlet opening 14 to the contact points of the tool 2 to the workpiece. When the tool 2 is driven by the arbor 100, a centrifugal force distributes the coolant in a uniform film flow to the contact points of the tool 2 to the workpiece.

The fluid distribution passage way 16 is composed of a first conduit 17 and at least one second conduit 18, the first conduit 17 extending coaxially to the adaptor 10. The first conduit 17 is connected with the at least one second conduit 18 tilted to the first conduit 17. The shape of the second conduit 18 can be e.g. cylindrical, conical or curved. The shape and geometry of the second conduit 18 can be adapted to different geometries of the tool 2 or of a distance disc which can be positioned between the adaptor 10 and the tool 2.

Moreover, the number of outlet openings 14 and the corresponding second conduits 18 can be adapted to different geometries of the tool 2 and to different need of coolant supply.

In the adaptor 10 shown in FIG. 1 the at least one second conduit 18 is perpendicular to the first conduit 17. But the present invention is not limited to this arrangement. The second conduit 18 is tilted to the first conduit 17. Therefore, the second conduit 18 can be arranged in any suitable angle to the first conduit 17. Moreover, the second conduit 18 does not necessarily extend parallel to the normal of the side face where the opening 14 cuts through. The second conduit 18 can also be curved. E.g. the second conduit 18 can extend from the first conduit 17 to the outlet opening 14 following a spiral curve. Thereby, a swirl or a counter swirl can be imparted to the coolant. I.e. the relative velocity between the coolant and the workpiece and/or tool 2 can be changed. With this variable velocity of the coolant and the workpiece and/or tool 2 the performance of a machining operation can be further optimized.

The adaptor 10 according to the first embodiment of the present invention provides the advantage that standard tools like standard grinding wheels, standard cutting wheels, standard lapping wheels or standard polishing wheels can be used, which do not have to exhibit coolant supply conduits for delivering coolant to the contact points of the tool to the workpiece. This reduces the production costs of the tools themselves and therefore also the cost for the workpieces to be manufactured.

When using a cup style tool 2 the adaptor 10 according to the first embodiment of the present invention provides the advantage that coolant can be delivered to internal contact points of the tool 2 to the workpiece without the need for flexible coolant pipes. Therefore, a constant manual adjustment of these flexible coolant pipes is omitted. Moreover, the adaptor 10 allows a high pressure supply of coolant required for modern high speed hollow spindle machine tools, which is not possible with flexible coolant pipes known in the art. A further advantage of the adaptor 10 is that automatic changing of tool 2 is possible in the case a hollow spindle machine with an automated tool changing system is used.

Figure 2:
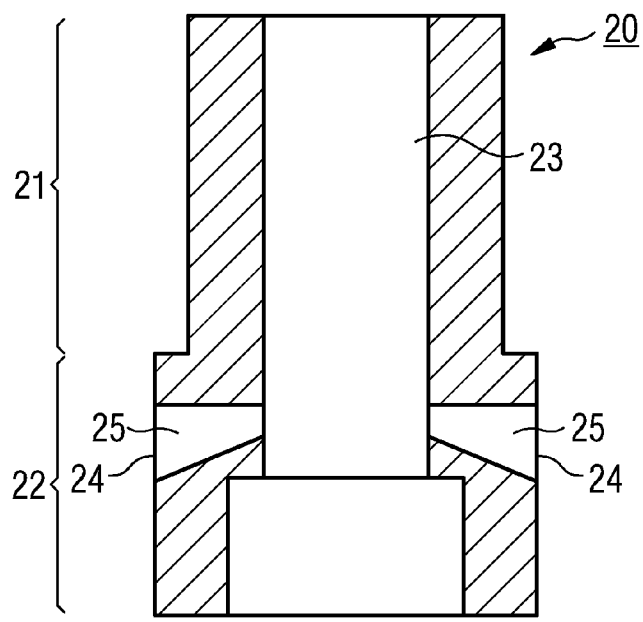
FIG. 2 shows a cross sectional view of an adaptor for fixing a tool to an arbor according to the second embodiment of the present invention.
Figure 3:
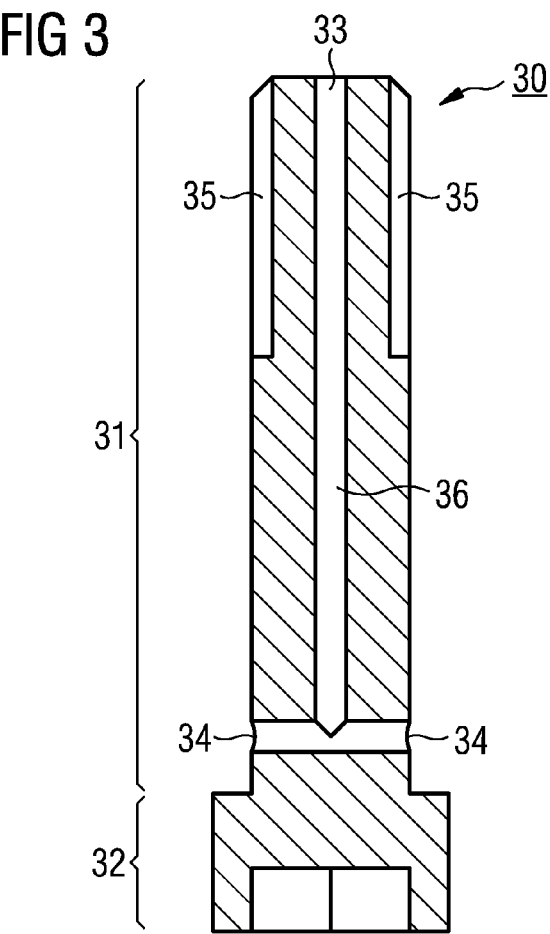
FIG. 3 shows a cross sectional view of a connection device for fixing an adaptor to an arbor according to the second embodiment of the present invention.

A second exemplary embodiment will be described in the following. FIG. 2 shows a cross sectional view of an adaptor 20 for fixing a tool 2 to an arbor 100 according to the second embodiment of the present invention and FIG. 3 shows a cross sectional view of a connection device 30 for fixing an adaptor 20 to an arbor 100 according to the second embodiment of the present invention.

The second embodiment of the present invention differs from the first embodiment therein that the adaptor 20 is fixed to an arbor 100 of e.g. a hollow spindle machine by a connection device 30.

The adaptor 20 comprises a first part 21 and a second part 22, wherein the first part 21 is connectable to an arbor 100. Moreover, the adaptor 20 comprises a vacancy 23 which extends through the first part 21 and the second part 22, wherein the vacancy 23 is adapted for accommodating a connection device 30. The second part 22 comprises at least one conduit 25, which connects the vacancy 23 with at least one outlet opening 24 disposed in the second part of the adaptor 20. The second part 22 radially protrudes over the first part 21 so that the second part 22 is adapted for holding a tool 2 when the tool 2 is positioned between the arbor 100 and the adaptor 20 and the adaptor 20 is fixed to the arbor by the connection device 30.

In FIG. 2 an adaptor 20 with two outlet openings 24 is shown. The outlet openings 24 are disposed on the side face of the second part 22 of the adaptor 20. However, the at least one outlet opening 24 can also be disposed on e.g. the front face of the second part 22 of the adaptor.

To fix the adaptor 20 to an arbor 100 a connection device 30 is positioned in the vacancy 23 of the adaptor 20. The connection device 30 is adapted for fixing the adaptor 20 to an arbor 100, wherein the arbor 100 exhibits a central passage way 101. The connection device 30 comprises an inlet opening 33 at a first part 31, wherein the inlet opening 31 is connectable to the central passage way 101 of the arbor 100. Moreover, the connection device 30 comprises at least one outlet port 34 at the first part 32. A second part 32 of the connection device 30 radially protrudes over the first part 31, so that the connection device 30 is adapted for holding the adaptor 20. The inlet opening 33 is connected with the at least one outlet port by a fluid distribution passage way 36. Moreover, the connection device 30 comprises a connection means 35. The connection means 35 can e.g. be a thread so that the connection device 30 can be screwed into a winding of the arbor 100. A tool 2 positioned between the adaptor 20 and the arbor 100 is fixed to the arbor 100 by the second part 22 of the adaptor 20, the second part 22 radially protruding over the first part 21 of the adaptor 20, when the adaptor 20 is fixed to the arbor 100 by the connection device 30. But the connection means 35 is not limited to a thread. The connection between the connection device 30 and the arbor 100 can alternatively be realized by clamping, by frictional connection or by a snap fit.

When the tool 2 is fixed to the arbor 100 by the adaptor 20 and the connection device 30, the at least one outlet port 34 corresponds to the at least one conduit 25 of the adaptor 20, so that coolant can be supplied to the tool 2 via the at least one outlet opening 24 of the adaptor 20. It is possible to arrange a not shown annulus between the at least one outlet port 34 and the at least one outlet opening 24. This would create a small pressure drop and would ensure the coolant always finds its way from the inlet opening 33 to the at least one outlet opening 24. The inlet opening 33 of the connection device 30 is connected to a central passage way 101 of the arbor 100, which is not shown in FIG. 2 but in FIG. 4. Therefore, the at least one outlet opening 24 of the adaptor 20 is connected to the central passage way 101 of the arbor 100 via the fluid distribution passage way 36 and the inlet opening 33 of the connection device 30. A pressurized coolant, which is supplied through the central passage way 101 is supplied through the at least one outlet opening 24 to the contact points of the tool 2 to the workpiece. When the tool 2 is driven by the arbor 100, a centrifugal force distributes the coolant in a uniform film flow to the contact points of the tool 2 to the workpiece.

The shape and geometry of the conduit 25 of the adaptor 20 can be adapted to different geometries of the tool 2 or of a distance disc, which can be positioned between the adaptor 20 and the tool 2.

Moreover, the number of outlet openings 24 and the corresponding conduits 24 can be adapted to different geometries of the tool 2 and to different need of coolant supply.

In the adaptor 20 shown in FIG. 2 the at least one conduit 25 is perpendicular to the vacancy 23. But the present invention is not limited to this arrangement. The conduit 25 is tilted to the vacancy 23. Therefore, the at least one conduit 24 can be arranged in any suitable angle to the vacancy 23.

The adaptor 20 and the connection device 30 according to the first embodiment of the present invention constitute a system for fixing a tool 2 to an arbor 100. This system provides the advantage that standard tools like standard grinding wheels, standard cutting wheels, standard lapping wheels or standard polishing wheels can be used, which do not have to exhibit coolant supply conduits for delivering coolant to the contact points of the tool to the workpiece. This reduces the production costs of the tools themselves and therefore also the cost for the workpieces to be manufactured.

When using a cup style tool 2 the system consisting of the adaptor 20 and the connection device 30 according to the second embodiment of the present invention provides the advantage that coolant can be delivered to internal contact points of the tool 2 to the workpiece without the need for flexible coolant pipes. Therefore, a constant manual adjustment of these flexible coolant pipes is omitted. Moreover, the above described system allows a high pressure supply of coolant required for modern high speed hollow spindle machine tools, which is not possible with flexible coolant pipes known in the art. A further advantage of the above described system is that automatic changing of tools 2 is possible in the case a hollow spindle machine with an automated tool changing system is used.

A further advantage of the system consisting of the adaptor 20 and the connection device 30 is facilitated positioning of the adaptor 20 in relation to the arbor 100.

FIG. 4 shows an assembly example of a hollow spindle machine comprising an arbor 100 with a central passage way 101, a tool 2 for processing a workpiece, wherein the displayed tool 2 is a cup style tool, and a system for fixing the tool 2 to the arbor 100. The arbor 100 is adapted for driving the tool 2. In the hollow spindle machine shown in FIG. 4 the adaptor 20 and the connection device 30 according to the second embodiment are used. However, the hollow spindle machine can also be used with an adaptor 10 according to the first embodiment.

In the assembly example shown in FIG. 4 distance discs are provided between the adaptor and the tool 2 and between the tool 2 and the arbor 100. However, a hollow spindle machine using the adaptor 10 according to the first embodiment or using a adaptor 20 and a connection device 30 according to the second embodiment of the present invention can also be used without the displayed distance discs or with distance discs having different geometries depending on the geometry of the arbor 100, the adaptor 10, 20 and/or the connect device 30.

The invention claimed is:

1. An adaptor for fixing a tool to an arbor, the arbor comprising a central passage way for supplying a coolant, the adaptor comprising:
    an inlet opening at a first part of the adaptor, the inlet opening being connectable to the central passage way of the arbor;
    an outlet opening at a second part of the adaptor, the second part radially protruding over the first part and being adapted for holding the tool;
    a connection for fixing the adaptor to the arbor; and
    a fluid distribution passage way connecting the inlet opening with the outlet opening so that the coolant is supplied to the tool via the outlet opening of the adaptor,
    wherein the fluid distribution passage way comprises a first conduit connected with a second conduit, the first conduit extending along an axis of the adaptor and the second conduit being tilted to the first conduit,
    wherein the second conduit is conical, and
    wherein a diameter of the second conduit at the outlet opening is larger than a diameter of the second conduit at a contact point to the first conduit.

2. The adaptor according to claim 1, wherein the connection is a thread.

3. The adaptor according to claim 1, wherein the tool is a grinding tool for processing a workpiece in a hollow spindle machine.

4. The adaptor according to claim 1, wherein the arbor is adapted to drive the tool.

5. An adaptor for fixing a tool to an arbor, the arbor comprising a central passage way for supplying a coolant, the adaptor comprising:
    a first part connectable to the arbor;
    a second part radially protruding over the first part, the second part being adapted for holding the tool; and
    a vacancy through the first part and the second part, the vacancy being adapted for accommodating a connection device,
    wherein the second part comprises a conduit connecting the vacancy with an outlet opening in the second part, the conduit being tilted to the vacancy,
    wherein the conduit is conical, and
    wherein a diameter of the conduit at the outlet opening is larger than a diameter of the conduit at a contact point to the vacancy.

6. A connection device for fixing the adaptor of claim 5 to an arbor comprising a central passage way for supplying a coolant, the connection device comprising:
    a first part comprising an inlet opening and an outlet port, the inlet opening being connectable to the central passage way of the arbor;
    a second part radially protruding over the first part and being adapted for holding the adaptor;
    a connection for fixing the connection device to the arbor; and
    a fluid distribution passage way connecting the inlet opening with the outlet port,
    wherein the outlet port corresponds to the conduit of the adaptor when the connection device fixes the adaptor to the arbor so that the coolant is supplied to the tool via the outlet opening of the adaptor,
    wherein the outlet port corresponds to the conduit such that an inner diameter of the outlet port is smaller than an inner diameter of the conduit.

7. The connection device according to claim 6, wherein the connection is a thread.

\* \* \* \* \*